(12) United States Patent
Bilhe et al.

(10) Patent No.: US 10,138,170 B2
(45) Date of Patent: Nov. 27, 2018

(54) METHOD OF SURFACE MARKING A MECHANICAL PART WITH A PREDEFINED GRAPHICAL REPRESENTATION VISIBLE TO THE NAKED EYE

(71) Applicant: SAFRAN AIRCRAFT ENGINES, Paris (FR)

(72) Inventors: Pascal Bilhe, Moissy-Cramayel (FR); Geoffrey Begue-Duthu, Moissy-Cramayel (FR); Vincent Guipont, Villeblevin (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 636 days.

(21) Appl. No.: 14/434,221

(22) PCT Filed: Oct. 7, 2013

(86) PCT No.: PCT/FR2013/052374
§ 371 (c)(1),
(2) Date: Apr. 8, 2015

(87) PCT Pub. No.: WO2014/057195
PCT Pub. Date: Apr. 17, 2014

(65) Prior Publication Data
US 2015/0290744 A1    Oct. 15, 2015

(30) Foreign Application Priority Data
Oct. 8, 2012 (FR) ...................................... 12 59546

(51) Int. Cl.
*B23K 26/36* (2014.01)
*C04B 41/00* (2006.01)
(Continued)

(52) U.S. Cl.
CPC .......... *C04B 41/0036* (2013.01); *B41M 5/24* (2013.01); *C04B 41/5346* (2013.01);
(Continued)

(58) Field of Classification Search
CPC .............. B23K 26/0069; B23K 26/066; B23K 26/0665; B23K 26/356; C04B 41/0036;
(Continued)

(56) References Cited

U.S. PATENT DOCUMENTS 6,395,151 B1 * 5/2002 Schramm .............. C23C 14/042
                                                    118/723 VE
6,423,935 B1 * 7/2002 Hackel ............... B23K 26/0069
                                                    219/121.6
(Continued)

FOREIGN PATENT DOCUMENTS

EP      2 317 076 A2   5/2011
WO  WO 2011/036087 A1   3/2011

OTHER PUBLICATIONS

International Search Report dated Dec. 16, 2013 in PCT/FR2013/052374 filed Oct. 7, 2013.
(Continued)

*Primary Examiner* — Matthew J Daniels
*Assistant Examiner* — Lawrence D. Hohenbrink, Jr.
(74) *Attorney, Agent, or Firm* — Oblon, McClelland, Maier & Neustadt, L.L.P.

(57) ABSTRACT

The invention relates to a method of surface marking a mechanical part with a predefined graphical representation, the method comprising using a laser source to apply a single laser pulse to an outside surface of a part for marking, with a mask being interposed between the laser source and the outside surface of the part, the mask having a predefined
(Continued)

graphical representation, and the laser pulse having power flux density of at least 20 MW/cm² and a duration less than or equal to 100 ns.

12 Claims, 1 Drawing Sheet

(51) Int. Cl.
| | |
|---|---|
| *B41M 5/24* | (2006.01) |
| *C04B 41/53* | (2006.01) |
| *F01D 5/14* | (2006.01) |
| *B23K 26/066* | (2014.01) |
| *B23K 26/06* | (2014.01) |
| *B23K 26/356* | (2014.01) |
| *B41M 5/26* | (2006.01) |
| *B23K 26/00* | (2014.01) |

(52) U.S. Cl.
CPC .......... *F01D 5/147* (2013.01); *B23K 26/0069* (2013.01); *B23K 26/066* (2015.10); *B23K 26/0665* (2013.01); *B23K 26/356* (2015.10); *B41M 5/26* (2013.01); *B41M 5/262* (2013.01); *B41M 5/267* (2013.01); *F05D 2230/13* (2013.01)

(58) Field of Classification Search
CPC ....... C04B 41/5346; B41M 5/24; B41M 5/26; B41M 5/262; B41M 5/267; F01D 5/147; F05D 2230/13
USPC .......................................... 219/121.6, 121.85
See application file for complete search history.

(56) References Cited

U.S. PATENT DOCUMENTS

| | | | | |
|---|---|---|---|---|
| 2002/0192572 | A1* | 12/2002 | Lau ........................ | B82Y 10/00 430/5 |
| 2003/0153182 | A1* | 8/2003 | Yamazaki .......... | B23K 26/0604 438/689 |
| 2011/0099809 | A1 | 5/2011 | Hoevel et al. | |
| 2012/0183701 | A1 | 7/2012 | Pilz et al. | |

OTHER PUBLICATIONS

Wei Wang, "Experimental Studies and Numerical Simulation on Laser Shock Marking" Jiangsu University, China Master's Theses Full-Text Database. Science and Technology, 72 pages (with English abstract).

* cited by examiner

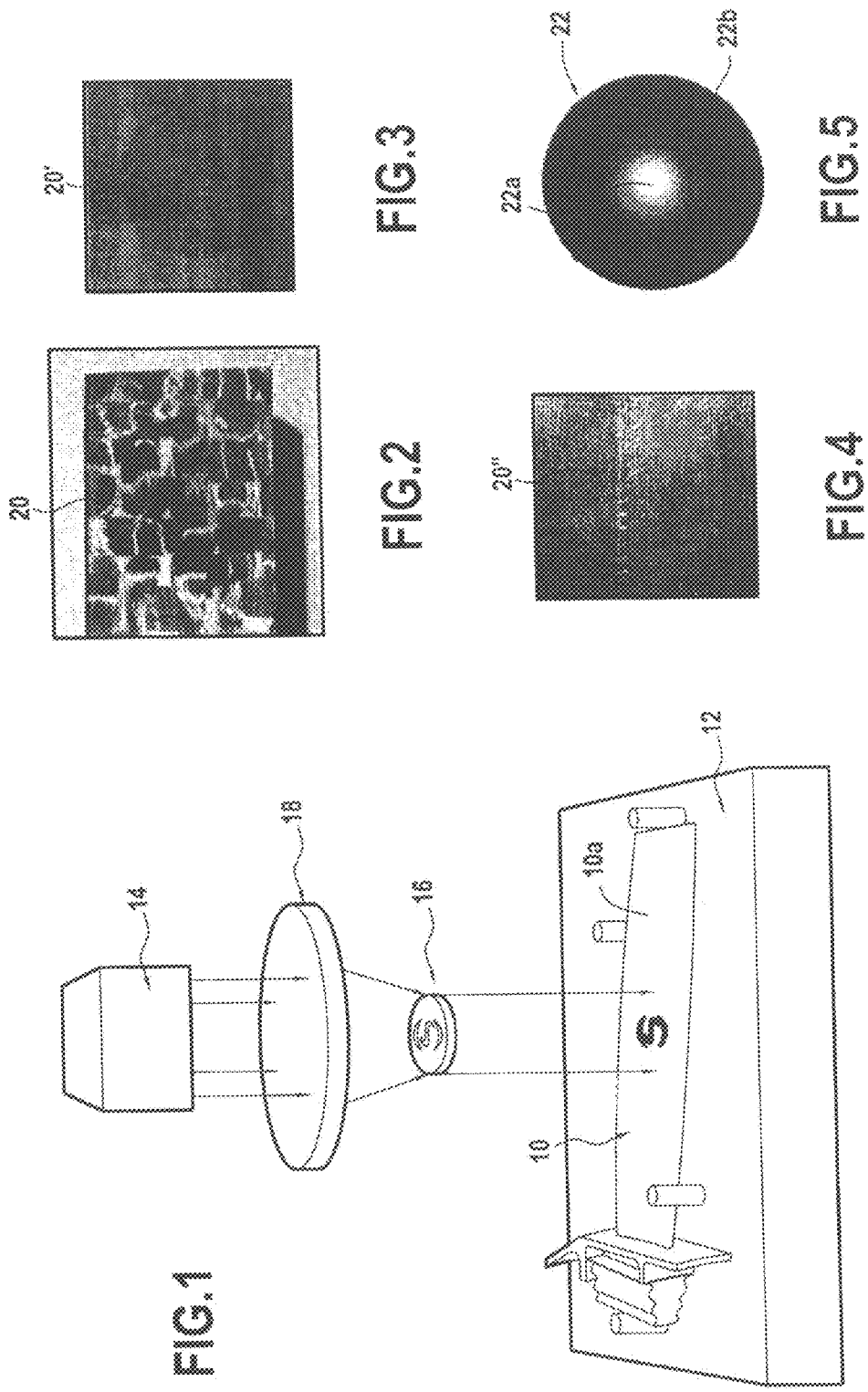

METHOD OF SURFACE MARKING A MECHANICAL PART WITH A PREDEFINED GRAPHICAL REPRESENTATION VISIBLE TO THE NAKED EYE

BACKGROUND OF THE INVENTION

The present invention relates to the general field of marking mechanical parts.

A field of application of the invention is that of marking aviation parts, and in particular parts for aviation turbine engines in order to enable them to be identified and authenticated.

In the aviation field, it is known to put a serial number on certain engine parts (e.g. in the form of a hexadecimal base code or in the form of a Datamatrix code), thereby enabling such parts to be identified (they are said to be "marked"). Using such a number, it is possible to know exactly that a part is authentic and to know its origin.

Marking is particularly desired for the blades of turbines and compressors in aviation turbine engines. Blades are critical replacement parts for which it is important to know their exact origin in order to take account of the influence of replacing such parts on the lifetime of the turbine or compressor in question.

Parts, and in particular turbine or compressor blades for an aviation turbine engine can be marked in various ways. It is thus known to perform marking by means of a laser that makes in imprint in the part for marking over a plurality of passes by removing material. It is also known to perform marking mechanically with the help of a hammer or a pneumatic piston that, by imparting successive impacts, enables a serial number of to be marked on a part. It is also known to perform marking by means of a manual or automatic milling machine.

Marking techniques that rely on the principle of removing material or of deforming the part for marking so as to place the desired serial number thereon present a manifest drawback for the soundness of the material of the part that is to be marked. Specifically for a part that is made as a single crystal of metal alloy, deforming or removing material can lead to localized recrystallization or to an irreversible defect in its microstructure.

Furthermore, with turbine or compressor blades, marking by those conventional techniques is generally performed on the roots of the blades. Marking a portion of the blade that is exposed to gas (e.g. its airfoil) cannot be envisaged: the gas sweeping over the surface of such a zone runs the risk of erasing the serial number by erosion/oxidation, or indeed by tearing out material. Furthermore, a crack starter at the location of the marking might appear as a result of vibratory fatigue.

Unfortunately, marking a blade on its root raises the problem of the root of a blade being a zone that is hidden once the blade is assembled, such that identifying the blade becomes impossible once it has been mounted in an engine.

OBJECT AND SUMMARY OF THE INVENTION

An object of the present invention is thus to provide a method that enables marking to be performed simply and quickly while not presenting the above-mentioned drawbacks.

In accordance with the invention, this object is achieved by a method of surface marking a mechanical part with a predefined graphical representation, the method comprising using a laser source to apply a single laser pulse to an outside surface of a part for marking, with a mask being interposed between the laser source and the outside surface of the part, the mask having a predefined graphical representation, and the laser pulse having power flux density of at least 20 megawatts per square centimeter ($MW/cm^2$) and a duration less than or equal to 100 nanoseconds (ns).

The Applicant has found that applying a laser pulse under the above-specified conditions through a mask makes it possible to make a mark (possibly visible to the naked eye, depending on the diameter of the impact of the laser pulse) on a mechanical part, and in particular on a gas turbine engine part, with very little ablation of material and with excellent ability to withstand oxidizing conditions at high temperature. In particular, it has been found that the imprint left by the single laser pulse on the surface of the part for marking is very superficial in depth (less than one micrometer). It has also been observed that the imprint made by the laser pulse is longlasting, even when it is subjected to high temperature (about 1100° C.) in a highly oxidizing atmosphere.

As a result, in an application to marking compressor or turbine blades, the method of the invention may be applied to the portion of the blade that is exposed to gas (i.e. to the airfoil), thereby avoiding all of the drawbacks of marking a zone of the blade that is hidden. In particular, it is possible to identify blades by means of their marking, even while the blades are mounted in the engine.

Furthermore, it has been found that the method of the invention is just as effective (in terms of little ablation of material and long life) regardless of whether the part for marking is made of metal (in particular Ni, Al, Ti, Fe, etc.), of composite material (in particular carbon fibers with an epoxy matrix), or of ceramic (in particular of zirconia).

Finally, the method of the invention is fast (only one laser pulse is needed), simple to perform (no material needs to be applied), and makes it possible to make marks with shapes that are complex (e.g. a company logo), depending on the selected mask.

A focusing lens may be interposed between the laser source and the mask in order to change the size of the beam emitted by the laser source. Which source may be an Nd-YAG laser. Furthermore, the laser pulse may have an impact diameter of at least 0.5 millimeters (mm), thereby ensuring that the resulting mark is visible to the naked eye.

When the part for marking is made of metal, the laser pulse preferably has power flux density lying in the range 0.04 $GW/cm^2$ to 0.55 $GW/cm^2$.

When the part for marking is made of composite material comprising carbon fibers and an epoxy matrix, the laser pulse preferably has power flux density lying in the range 0.15 $GW/cm^2$ to 2 $GW/cm^2$.

When the part for marking is made of ceramic, the laser pulse preferably has power flux density lying in the range 0.10 $GW/cm^2$ to 0.34 $GW/cm^2$.

According to an advantageous provision, the method further includes interposing an opaque mark between the laser source and the outside surface of the part, the opaque mark having a plurality of color gradations so as to obtain multi-contrast marking of the part. Having recourse to such an opaque mask enables the marks that are made to be more complex, thereby making them much more difficult to reproduce.

The invention also provides the use of the method as defined above for marking a fan blade, a turbine blade, or a compressor blade of an aviation turbine engine.

BRIEF DESCRIPTION OF THE DRAWINGS

Other characteristics and advantages of the present invention appear from the following description made with reference to the accompanying drawings, which show an implementation having no limiting character. In the figures:

FIG. 1 is a diagrammatic view of an example of a setup for performing the method;

FIGS. 2 to 4 are photos showing different examples of marking obtained by the method of the invention; and FIG. 5 is a diagrammatic view of an example opaque mask for performing a variant implementation of the invention.

DETAILED DESCRIPTION OF THE INVENTION

The invention applies to surface marking any mechanical part with a predefined graphical representation, and in particular to marking parts for aviation, and more particularly parts of a gas turbine engine.

The term "predefined graphical representation" is used to mean any predetermined design or geometrical shape, e.g. such as a logo, a serial number, a Datamatrix code, etc.

A non-limiting example application of the invention is that of surface marking fan blades, turbine blades, or compressor blades for an aviation turbine engine.

The method of the invention comprises applying a single laser pulse to the outside surface of a part for marking, with a mask being interposed between the laser source and the outside surface of the part, which mask has the predefined graphical representation that it is desired to mark on the part.

In the invention, the laser pulse that is applied to the outside surface of the part possesses power flux density of at least 20 MW/cm$^2$, and a duration that is less than or equal to 100 ns.

FIG. 1 is a diagram showing an example of a setup suitable for use in performing the marking method of the invention.

A part 10 for marking (e.g. a turbine blade) having an outside surface 10a on which the marking is to be performed is supported by a support stand 12. The outside surface 10a of the part faces upwards.

A laser source 14, e.g. an Nd-YAG type laser producing radiation at a wavelength of 1.064 micrometers (μm) and frequency-doubled is positioned over the support stand 12 and is configured to deliver pulses having power flux density of not less than 20 MW/cm$^2$ for a duration that is less than or equal to 100 ns.

Furthermore, a mask 16 having a predefined graphical representation is interposed between the laser source and the outside surface 10a of the part 10 for marking. Likewise, a focusing lens 18 (convergent or divergent) is positioned between the laser 14 and the mask 16 in order to match the size of the beam emitted by the laser to the dimensions of the mask.

As a result, the laser 14 produces radiation that is focused by means of the focusing lens 18 into a beam that passes through the mask 16 before illuminating a selected zone of the outside surface of the part. The laser pulse produced by the laser 14 generates a plasma in this zone, and expansion of the plasma gives rise to a large amount of (thermomechanical and acoustic) energy being released, thereby causing local modification to the surface of the part for marking. When the laser pulse produced by the laser is set at specified above (i.e. with power flux density of at least 20 MW/cm$^2$ and duration less than or equal to 100 ns), this local modification to the surface of the part gives rise to an imprint that is left in the surface of the part.

As a result, the marking obtained by the method of the invention is in the form of an imprint left in the surface of the part, which imprint possesses a design corresponding to that of the mask used (where the mask acts as a negative).

This imprint presents dimensions, specifically a diameter, corresponding to the diameter of the impact of the laser pulse produced by the laser. Thus, with an impact diameter of at least 0.5 mm for the laser pulse, the marking that is obtained presents a diameter of at least 0.5 mm (which makes it possible for it to be visible to the naked eye). This diameter may be up to 150 mm (if necessary by having recourse to a focusing lens 18 that is divergent).

When the laser pulse is applied under such conditions, it has been found that only one pulse is needed to mark the part. In particular, there is no need to apply a plurality of laser pulses to the same zone in order to obtain such a result.

It has also been found using a profile meter that the imprint left in the outside surface 10a of the part 10 is very superficial in depth (less than one micrometer) regardless of the impact diameter and regardless of the material of the part (metal, ceramic, or composite).

It has also been found that the marking that is obtained, even though it is of very superficial depth, nevertheless withstands an environment that is highly oxidizing and at high temperature. In particular, tests have demonstrated that such marking (made on a nickel part) remains after performing 700 cycles of 1 hour (h), each in air at 1100° C.

It should be observed that a mark can be marked without it being necessary to have a confinement medium that is transparent at the laser wavelength used (such as for example water or glass for an Nd-YAG type laser) in order to obtain better expansion of the plasma generated by the laser.

Likewise, it may be observed that the marking can be performed in an ambient atmosphere, providing the power flux density of the laser pulse produced by the laser is limited to 10 GW/cm$^2$ (which corresponds to the breakdown threshold of air). For power flux density at values higher than 10 GW/cm$^2$, marking needs to be performed in a vacuum.

The marking method of the invention may be applied to any type of material. In particular, it is well adapted to marking parts made of metal, of ceramic, or of composite material. It also applies to any surface coating material for a part.

When the part for marking is made of metal, a power flux density should be applied that preferably lies in the range 0.04 GW/cm$^2$ to 0.55 GW/cm$^2$ so as to obtain an imprint that is perfectly intelligible.

More precisely, with a part made of nickel, a power flux density is advantageously applied that lies in the range 0.10 GW/cm$^2$ to 0.52 GW/cm$^2$. For a part made of aluminum, a power flux density should be applied that lies in the range 0.20 GW/cm$^2$ to 0.55 GW/cm$^2$, and for a part made of steel, a power flux density should be applied that preferably lies in the range 0.10 GW/cm$^2$ to 0.50 GW/cm$^2$.

Furthermore, with a part for marking that is made of composite material having carbon fibers and an epoxy matrix, the laser pulse should preferably have power flux density lying in the range 0.15 GW/cm$^2$ to 2 GW/cm$^2$ so as to obtain an imprint that is perfectly intelligible.

Finally, with a part for marking that is made of ceramic, the laser pulse should preferably have power flux density lying in the range 0.10 GW/cm$^2$ to 0.34 GW/cm$^2$, in order to obtain an imprint that is perfectly intelligible.

With reference to FIGS. 2 to 4, there follows a description of various examples of marking made using the method of the invention.

FIG. 2 is a photo (scale 4:1) showing the result of applying a laser pulse in accordance with the method of the invention on a substrate of composite material of the carbon/carbon type.

The marking 20 in this figure that is visible to the naked eye and that is circular in shape was obtained by means of a single laser pulse having an impact diameter of 8.7 mm, power flux density equal to 99 MW/cm$^2$, and a duration of 5.2 ns. The mask used did not possess any graphical representation.

Likewise, FIG. 3 is a photo (scale 4:1) showing the result of applying a laser pulse in accordance with the method of the invention to a substrate made of zirconium dioxide (ZrO$_2$/Y$_2$O$_3$).

The marking 20' in this figure that is visible to the naked eye and that is circular in shape was obtained by means of a single laser pulse having an impact diameter of 9.1 mm, power flux density equal to 135 MW/cm$^2$, and a duration of 5.2 ns. The mask used did not have any graphical representation.

Finally, FIG. 4 is a photo (scale 4:1) showing the result of applying a laser pulse in accordance with the method of the invention to a substrate made of aluminum.

The marking 20" in this figure that is visible to the naked eye and that is circular in shape was obtained by means of a single laser pulse having an impact diameter of 13 mm, a power flux density equal to 41 MW/cm$^2$, and a duration of 5.2 ns. The mask used did not possess any graphical representation.

Together these photos show that applying a single laser pulse under the above-specified power flux density and duration conditions make it possible to obtain marking that is perfectly intelligible regardless of the material of the part that is to be marked (or of its surface coating), this marking being innocuous for the material of the part and being capable of withstanding an environment that is both oxidizing and at high temperature.

According to an advantageous provision, it is possible to interpose an additional mask referred to as an "opaque" mask between the laser source and the outside surface of the part for marking. This opaque mask is in addition to the mask 16 having a predefined graphical representation as described above (the opaque mask may be positioned equally well upstream or downstream from the mask 16 in the travel direction of the laser beam).

The opaque mask is in the form of a mask comprising a medium (e.g. a liquid or a glass) with a plurality of color gradations so as to obtain multi-contrast marking of the part.

In particular, the opaque mask should be selected in such a manner as to provide controlled attenuation of the intensity of the laser source as a function of the pattern of the mask for reproducing on the part. Thus, the zones of the opaque mask with little attenuation pass greater laser intensity, while the zones with considerable attenuation pass only very little laser intensity.

FIG. 5 shows an example of an opaque mask 22 suitable for use in obtaining contrast gradation for marking. In this example, the opaque mask 22 has a central zone 22a with little attenuation and a peripheral zone 22b with stronger attenuation. Using such an opaque mask thus makes it possible to obtain a graphical representation having contrast gradation between the central zone and the peripheral zone of the representation.

The invention claimed is:

1. A method of surface marking a mechanical part with a predefined graphical representation, the method comprising:
using a laser source to apply only a single laser pulse to an outside surface of the mechanical part for marking with a mask being interposed between the laser source and the outside surface of the mechanical part, the mask having a predefined graphical representation, and the single laser pulse having power flux density of at least 20 MW/cm$^2$ and a duration less than or equal to 100 ns so that an imprint left in the outside surface of the part is less than 1 μm in depth,
wherein the outside surface of the part is directly in contact with ambient atmosphere when the single laser pulse is applied.

2. The method according to claim 1, wherein a focusing lens is interposed between the laser source and the mask.

3. The method according to claim 1, wherein the laser source is an Nd-YAG laser.

4. The method according to claim 1, wherein the single laser pulse has an impact diameter of at least 0.5 mm.

5. The method according to claim 1, wherein, when the mechanical part for marking is made of metal, and the power flux density of the single laser pulse lies in a range of 0.04 GW/cm$^2$ to 0.55 GW/cm$^2$.

6. The method according to claim 1, wherein, when the mechanical part for marking is made of composite material comprising carbon fibers and an epoxy matrix, and the power flux density of the single laser pulse lies in a range of 0.15 GW/cm$^2$ to 2 GW/cm$^2$.

7. The method according to claim 1, wherein, when the mechanical part for marking is made of ceramic, and the power flux density of the single laser pulse lies in a range of 0.10 GW/cm$^2$ to 0.34 GW/cm$^2$.

8. The method according to claim 1, further comprising interposing an opaque mask between the laser source and the outside surface of the mechanical part, the opaque mask having a plurality of color gradations so as to obtain multi-contrast marking of the part.

9. The method according to claim 1, wherein the mechanical part is a fan blade, a turbine blade, or a compressor blade of an aviation turbine engine.

10. The method according to claim 5, when the mechanical part for marking is made of nickel, and the power flux density of the single laser pulse lies in a range of 0.10 GW/cm$^2$ to 0.52 GW/cm$^2$.

11. The method according to claim 5, when the mechanical part for marking is made of aluminum, and the power flux density of the single laser pulse lies in a range of 0.20 GW/cm$^2$ to 0.55 GW/cm$^2$.

12. The method according to claim 5, when the mechanical part for marking is made of steel, and the power flux density of the single laser pulse lies in a range of 0.10 GW/cm$^2$ to 0.50 GW/cm$^2$.

* * * * *